(12) United States Patent
Reiche et al.

(10) Patent No.: US 10,315,119 B2
(45) Date of Patent: Jun. 11, 2019

(54) VIDEO GAME WITH CONCURRENT PROCESSING OF GAME-RELATED PHYSICAL OBJECTS

(75) Inventors: Paul Reiche, Novato, CA (US); Robert Leyland, Novato, CA (US); Charles H Batson, III, Novato, CA (US)

(73) Assignee: Activision Publishing, Inc., Santa Monica, CA (US)

(*) Notice: Subject to any disclaimer, the term of this patent is extended or adjusted under 35 U.S.C. 154(b) by 0 days.

(21) Appl. No.: 13/109,956

(22) Filed: May 17, 2011

(65) Prior Publication Data

US 2012/0295703 A1    Nov. 22, 2012

(51) Int. Cl.
*A63F 13/95* (2014.01)
*A63F 13/235* (2014.01)

(52) U.S. Cl.
CPC ............ *A63F 13/95* (2014.09); *A63F 13/235* (2014.09); *A63F 2300/1031* (2013.01); *A63F 2300/206* (2013.01); *A63F 2300/609* (2013.01); *A63H 2200/00* (2013.01)

(58) Field of Classification Search
CPC ..... A63H 2200/00; A63F 13/95; A63F 13/10; A63F 13/31; A63F 13/323; A63F 13/45; A63F 13/49; A63F 13/55; A63F 13/58; A63F 13/60; A63F 13/67; A63F 13/69; A63F 2300/204; A63F 2300/206; A63F 2300/65
USPC .......................................................... 463/31
See application file for complete search history.

(56) References Cited

U.S. PATENT DOCUMENTS

| | | | |
|---|---|---|---|
| 4,840,602 A | 6/1989 | Rose | |
| 5,190,285 A * | 3/1993 | Levy | ................... A63F 3/00028 273/237 |
| 5,413,355 A | 5/1995 | Gonzalez | |
| 5,533,920 A | 7/1996 | Arad et al. | |
| 5,661,470 A | 8/1997 | Karr | |

(Continued)

FOREIGN PATENT DOCUMENTS

| | | |
|---|---|---|
| GB | 2365796 A | 2/2002 |
| WO | WO 2005/050948 | 6/2005 |
| WO | WO 2007-101785 A1 | 9/2007 |

OTHER PUBLICATIONS

Joint Technical Committee ISO/IEC JTC1/SC17, Information Technology, Subcommittee SC17, Final Committee Draft ISO/IEC 14443-3, Identification Cards—Contactless Integrated Circuit(s) Cards—Proximity Cards, Part 3: Initialization and Anticollision. Jun. 11, 1999.
ATMEL, Requirements of ISO/IEC 14443 Type B Proximity Contactless Identification Codes. Nov. 2005.

(Continued)

*Primary Examiner* — David L Lewis
*Assistant Examiner* — Steven J Hylinski
(74) *Attorney, Agent, or Firm* — Klein, O'Neill & Singh, LLP

(57) ABSTRACT

A video game includes a peripheral device that senses the presence and identity of toys near or on the peripheral. Each of the toys includes an identification device such as an RFID tag. Each of the toys is also associated with a corresponding game character or object. A toy stores information about the status of the corresponding character or object in the game, for example, a character name, a score, and an owner of the toy may be stored in a character toy. The information about the toy is updated during game play. The toys may be sensed, read, and written concurrently.

22 Claims, 14 Drawing Sheets

(56) References Cited

U.S. PATENT DOCUMENTS

| | | | |
|---|---|---|---|
| 5,752,880 A | 5/1998 | Gabai et al. | |
| 5,766,077 A * | 6/1998 | Hongo | 463/30 |
| 5,772,512 A * | 6/1998 | Chichester | 463/40 |
| 5,810,666 A | 9/1998 | Mero et al. | |
| 5,853,327 A | 12/1998 | Gilboa | |
| 5,873,765 A | 2/1999 | Rifkin et al. | |
| 6,056,618 A | 5/2000 | Larian | |
| 6,083,073 A | 7/2000 | McFarlane et al. | |
| 6,167,353 A | 12/2000 | Piernot et al. | |
| 6,290,565 B1 | 9/2001 | Galyean, III et al. | |
| 6,353,877 B1 * | 3/2002 | Duncan | G06F 12/0835 710/306 |
| 6,354,947 B1 | 3/2002 | Dobrusskin et al. | |
| 6,392,613 B1 * | 5/2002 | Goto | A63F 13/12 345/30 |
| 6,491,566 B2 | 12/2002 | Peters et al. | |
| 6,544,097 B1 | 4/2003 | Bain | |
| 6,560,511 B1 * | 5/2003 | Yokoo | A63H 11/00 318/568.11 |
| 6,709,336 B2 | 3/2004 | Siegel et al. | |
| 6,729,934 B1 | 5/2004 | Driscoll et al. | |
| 6,737,957 B1 | 5/2004 | Petrovic et al. | |
| 6,761,637 B2 | 7/2004 | Weston et al. | |
| 6,773,325 B1 | 8/2004 | Mawle et al. | |
| 6,773,326 B2 | 8/2004 | Jarvis | |
| 6,796,908 B2 | 9/2004 | Weston | |
| 6,905,391 B2 | 6/2005 | Soto et al. | |
| 6,965,298 B2 | 11/2005 | Feinberg | |
| 6,967,566 B2 | 11/2005 | Weston et al. | |
| 7,001,276 B2 | 2/2006 | Shinoda | |
| 7,066,781 B2 | 6/2006 | Weston | |
| 7,081,033 B1 | 7/2006 | Mawle et al. | |
| 7,244,183 B1 | 7/2007 | England | |
| 7,297,063 B2 | 11/2007 | Fujisawa et al. | |
| 7,331,857 B2 | 2/2008 | MacIver | |
| 7,338,377 B2 | 3/2008 | Shinoda | |
| 7,387,559 B2 | 6/2008 | Sanchez-Castro et al. | |
| 7,425,169 B2 | 9/2008 | Ganz | |
| 7,465,212 B2 | 12/2008 | Ganz | |
| 7,488,231 B2 | 2/2009 | Weston | |
| 7,500,917 B2 | 3/2009 | Barney et al. | |
| 7,502,759 B2 | 3/2009 | Hannigan et al. | |
| 7,524,246 B2 | 4/2009 | Briggs et al. | |
| 7,534,157 B2 | 5/2009 | Ganz | |
| 7,568,964 B2 | 8/2009 | Ganz | |
| 7,604,525 B2 | 10/2009 | Ganz | |
| 7,614,958 B2 | 11/2009 | Weston et al. | |
| 7,618,303 B2 | 11/2009 | Ganz | |
| 7,645,178 B1 * | 1/2010 | Trotto | A63H 3/00 446/268 |
| 7,677,948 B2 | 3/2010 | Ganz | |
| 7,789,726 B2 | 9/2010 | Ganz | |
| 7,808,385 B2 | 10/2010 | Zheng | |
| 7,843,471 B2 | 11/2010 | Doan et al. | |
| 7,846,004 B2 | 12/2010 | Ganz | |
| 7,850,527 B2 | 12/2010 | Barney et al. | |
| 7,862,428 B2 | 1/2011 | Borge | |
| 7,878,905 B2 | 2/2011 | Weston et al. | |
| 7,883,416 B2 | 2/2011 | Dobrusskin et al. | |
| 7,883,420 B2 | 2/2011 | Bradbury et al. | |
| 7,909,697 B2 | 3/2011 | Zheng | |
| 7,982,613 B2 | 7/2011 | Zheng | |
| 8,033,901 B2 * | 10/2011 | Wood | 463/1 |
| 8,157,611 B2 | 4/2012 | Zheng | |
| 8,230,414 B1 * | 7/2012 | Hand | G06F 8/61 717/168 |
| 8,469,766 B2 * | 6/2013 | Zheng | A63H 3/28 446/175 |
| 9,457,281 B1 * | 10/2016 | Lam | A63H 33/00 |
| 2002/0028710 A1 * | 3/2002 | Ishihara | A63F 13/02 463/44 |
| 2002/0035405 A1 * | 3/2002 | Yokoo | A63F 13/005 700/86 |
| 2002/0183119 A1 * | 12/2002 | Fessler | A63F 13/02 463/47 |
| 2003/0037075 A1 * | 2/2003 | Hannigan | G06Q 30/02 715/201 |
| 2003/0076369 A1 | 4/2003 | Resner et al. | |
| 2004/0142751 A1 * | 7/2004 | Yamagami | 463/43 |
| 2004/0178886 A1 * | 9/2004 | Watanabe et al. | 340/10.1 |
| 2004/0214642 A1 | 10/2004 | Beck | |
| 2004/0260670 A1 * | 12/2004 | Tokimitsu | G06F 17/30067 |
| 2005/0017454 A1 | 1/2005 | Endo et al. | |
| 2005/0148390 A1 * | 7/2005 | Murase | A63F 13/12 463/40 |
| 2005/0182693 A1 * | 8/2005 | Alivandi | A63F 13/12 705/26.5 |
| 2006/0003843 A1 * | 1/2006 | Kobayashi | A63F 13/10 463/43 |
| 2006/0030410 A1 | 2/2006 | Stenton et al. | |
| 2006/0273909 A1 * | 12/2006 | Heiman et al. | 340/572.7 |
| 2007/0015588 A1 * | 1/2007 | Matsumoto et al. | 463/43 |
| 2007/0032282 A1 * | 2/2007 | Hamamoto | A63F 13/10 463/9 |
| 2007/0087839 A1 * | 4/2007 | Bradbury | A63F 13/02 463/43 |
| 2007/0093172 A1 | 4/2007 | Zheng | |
| 2007/0143679 A1 | 6/2007 | Resner | |
| 2007/0174557 A1 * | 7/2007 | Watanabe | G06F 12/0828 711/146 |
| 2007/0197297 A1 | 8/2007 | Witchey | |
| 2007/0211047 A1 * | 9/2007 | Doan et al. | 345/419 |
| 2007/0250597 A1 | 10/2007 | Resner et al. | |
| 2007/0256716 A1 | 11/2007 | Resner et al. | |
| 2007/0288673 A1 * | 12/2007 | Kawaguchi | G05B 19/054 710/110 |
| 2008/0009350 A1 * | 1/2008 | Ganz | 463/42 |
| 2008/0085773 A1 * | 4/2008 | Wood | 463/43 |
| 2008/0140528 A1 | 6/2008 | Ganz et al. | |
| 2008/0141367 A1 | 6/2008 | Ganz et al. | |
| 2008/0153594 A1 | 6/2008 | Zheng | |
| 2008/0163055 A1 | 7/2008 | Ganz et al. | |
| 2008/0261702 A1 * | 10/2008 | Rubin | 463/43 |
| 2008/0274805 A1 | 11/2008 | Ganz et al. | |
| 2008/0274806 A1 | 11/2008 | Ganz et al. | |
| 2008/0274811 A1 | 11/2008 | Ganz et al. | |
| 2008/0275789 A1 | 11/2008 | Ganz et al. | |
| 2008/0280684 A1 * | 11/2008 | McBride | A63F 13/12 463/42 |
| 2008/0305873 A1 | 12/2008 | Zheng | |
| 2009/0053970 A1 | 2/2009 | Borge | |
| 2009/0054155 A1 | 2/2009 | Borge | |
| 2009/0063271 A1 | 3/2009 | Ganz et al. | |
| 2009/0124165 A1 | 5/2009 | Weston | |
| 2009/0132267 A1 | 5/2009 | Ganz | |
| 2009/0132357 A1 | 5/2009 | Ganz | |
| 2009/0132656 A1 | 5/2009 | Ganz | |
| 2009/0137185 A1 | 5/2009 | Zheng | |
| 2009/0137323 A1 * | 5/2009 | Fiegener et al. | 463/43 |
| 2009/0158210 A1 | 6/2009 | Cheng et al. | |
| 2009/0204420 A1 | 8/2009 | Ganz | |
| 2009/0204908 A1 | 8/2009 | Ganz et al. | |
| 2009/0228557 A1 | 9/2009 | Ganz et al. | |
| 2009/0240659 A1 | 9/2009 | Ganz et al. | |
| 2009/0248544 A1 | 10/2009 | Ganz | |
| 2009/0254434 A1 | 10/2009 | Ganz et al. | |
| 2009/0307609 A1 | 12/2009 | Ganz et al. | |
| 2009/0318234 A1 | 12/2009 | Christensen et al. | |
| 2010/0042486 A1 | 2/2010 | Borst et al. | |
| 2010/0049921 A1 * | 2/2010 | Aronovich | G06F 12/0813 711/130 |
| 2010/0058235 A1 | 3/2010 | Borst | |
| 2010/0107214 A1 | 4/2010 | Ganz | |
| 2010/0151940 A1 | 6/2010 | Borge | |
| 2010/0161443 A1 | 6/2010 | Ganz et al. | |
| 2010/0167623 A1 | 7/2010 | Eyzaguirre et al. | |
| 2010/0222146 A1 * | 9/2010 | Evans et al. | 463/36 |
| 2010/0293473 A1 | 11/2010 | Borst et al. | |
| 2010/0325182 A1 | 12/2010 | Ganz | |
| 2011/0021109 A1 * | 1/2011 | Le | A63H 3/28 446/300 |

(56) References Cited

U.S. PATENT DOCUMENTS

| | | | |
|---|---|---|---|
| 2011/0047600 A1* | 2/2011 | Johnson et al. ............... 726/4 |
| 2012/0102080 A1* | 4/2012 | Kirihata ............... G06F 21/604 |
| | | | 707/831 |
| 2012/0157206 A1* | 6/2012 | Crevin .................... A63F 13/04 |
| | | | 463/36 |
| 2012/0295703 A1* | 11/2012 | Reiche .................... A63F 13/95 |
| | | | 463/31 |

OTHER PUBLICATIONS

Microchip, microID 13.56 MHz RFID System Design Guide. 2004.
Sonmicro, SM130, SM1013 Evaluation Kit, Mifare Brief Technical Information, SMRFID MIFARE v1.0 Software, User Manual, Jun. 2006.
Sun, Raymond. "Activision Patent Applications—Prior Art." Apr. 9, 2013. Print.
Sun, Raymond. "Patent Portfolio for Skylanders." Mar. 27, 2013. Print.
International Search Report on related PCT Application No. PCT/US2012/038204 from International Searching Authority (KIPO) dated Jan. 30, 2013.
Written Opinion on related PCT Application No. PCT/US2012/038204 from International Searching Authority (KIPO) dated Jan. 30, 2013.
Extended European Search Report (EESR) on related European Application No. 12784982.6 from the European Patent Office (EPO) dated Aug. 26, 2014.
Office Action on related European Application No. 12784982.6 from the European Patent Office (EPO) dated Oct. 26, 2015.

* cited by examiner

VIDEO GAME WITH CONCURRENT PROCESSING OF GAME-RELATED PHYSICAL OBJECTS

BACKGROUND OF THE INVENTION

The present invention relates generally to video games and, more particularly, to a video game and a peripheral for a video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Merely interacting with a displayed simulated environment may not allow game players to fully relate to game play, with a sharply distinct separation between a game play world and the world physically inhabited by the game players. Moreover, when the electronic device providing game play action is unavailable, for example when off or used for other purposes, as may often by the case when the electronic device is a personal computer, reminders of the joy of game play may also be unavailable.

BRIEF SUMMARY OF THE INVENTION

One aspect of the invention provides a computer implemented method for use in providing a video game, comprising: receiving initial information from a memory of a toy, the memory of the toy including at least initial info nation and further information; displaying a representation of a game character associated with the toy utilizing the initial information, without regard as to whether further information from the memory of the toy has been received; receiving the further information from the memory of the toy; and modifying status of the game character associated with the toy utilizing the further information.

Another aspect of the invention provides a computer implemented method for use in providing a video game, comprising: detecting toys present in a predefined region; determining changes in the toys detected relative to a previous detection of toys present; and for each toy determined to have been added, adding a game character associated with the added toy to the video game, adding the game character associated with the added toy to the video game comprising: reading sequence values from each of a plurality of data areas of a memory of the added toy, each of the sequence values indicative of when the corresponding data area was written; determining, utilizing the sequence values, the current one of the data areas; and adding the game character associated with the added toy to the video game utilizing information from the current data area.

Another aspect of the invention provides a computer implemented method for providing a video game, comprising: reading sequence values from each of a plurality of data areas of a memory of a toy, each of the sequence values indicative of when the corresponding data area was written, each of the data areas having data values indicating information about a game character associated with the toy; comparing the read sequence values and a sequence value associated with cached data values to determine a latest sequence value; processing the game character in the video game utilizing the data values associated with the latest sequence value.

Another aspect of the invention provides a computer implemented method for providing a video game, comprising: determining a type of event affecting a game character; when the determined type of event is a first type, writing, after a time period, information based on the event to a toy associated with the game character; and when the determined type of event is a second type, writing, without substantial delay, information based on the event to the toy associated with the game character.

Another aspect of the invention provides a peripheral for a game console, comprising: a radio frequency identification interface configured for sensing toys proximate the peripheral; a game console interface configured for coupling data to the game console; and a controller coupled to the radio frequency identification interface and the game console interface, the controller configured to: command the radio frequency identification interface to sense identifiers of toys proximate the peripheral; and supply the identifiers of the sensed toys to the game console via the game console interface.

Another aspect of the invention provides a video game system, comprising: a peripheral configured to sense identifiers of toys proximate the peripheral and read information from and write information to memories of the toys; and a processor configured by program instructions, the processor data coupled to the peripheral, the program instructions comprising instructions to: receive the identifiers of toys proximate the peripheral; determine changes in the toys detected relative to a previous sensing of toys proximate the peripheral; and for each toy determined to have been added, add a game character associated with the added toy to the video game, the instructions to add the game character associated with the added toy to the video game comprising instructions to: command the peripheral to read initial information from a memory of the added toy; command display of a representation of the game character associated with the added toy utilizing the initial information; command the peripheral to read further information from the memory of the added toy; and modify status of the game character associated with the added toy utilizing the further information.

Another aspect of the invention provides a non-transitory machine-readable medium for a video game, the machine-readable medium comprising program instructions for: commanding a peripheral device to detect toys present in a region; determining changes in the toys detected relative to a previous detection of toys present; and for each toy determined to have been added, adding a game character associated with the added toy to the video game, the program instructions for adding the game character associated with the added toy to the video game comprising program instructions for: commanding the peripheral device to read initial information from a memory of the added toy; commanding display of a representation of the game character associated with the added toy utilizing the initial information; commanding the peripheral device to read further information from the memory of the added toy; and modify status of the game character associated with the added toy utilizing the further information.

These and other aspects of the invention are more fully comprehended upon review of this disclosure.

DETAILED DESCRIPTION

Figure 1:
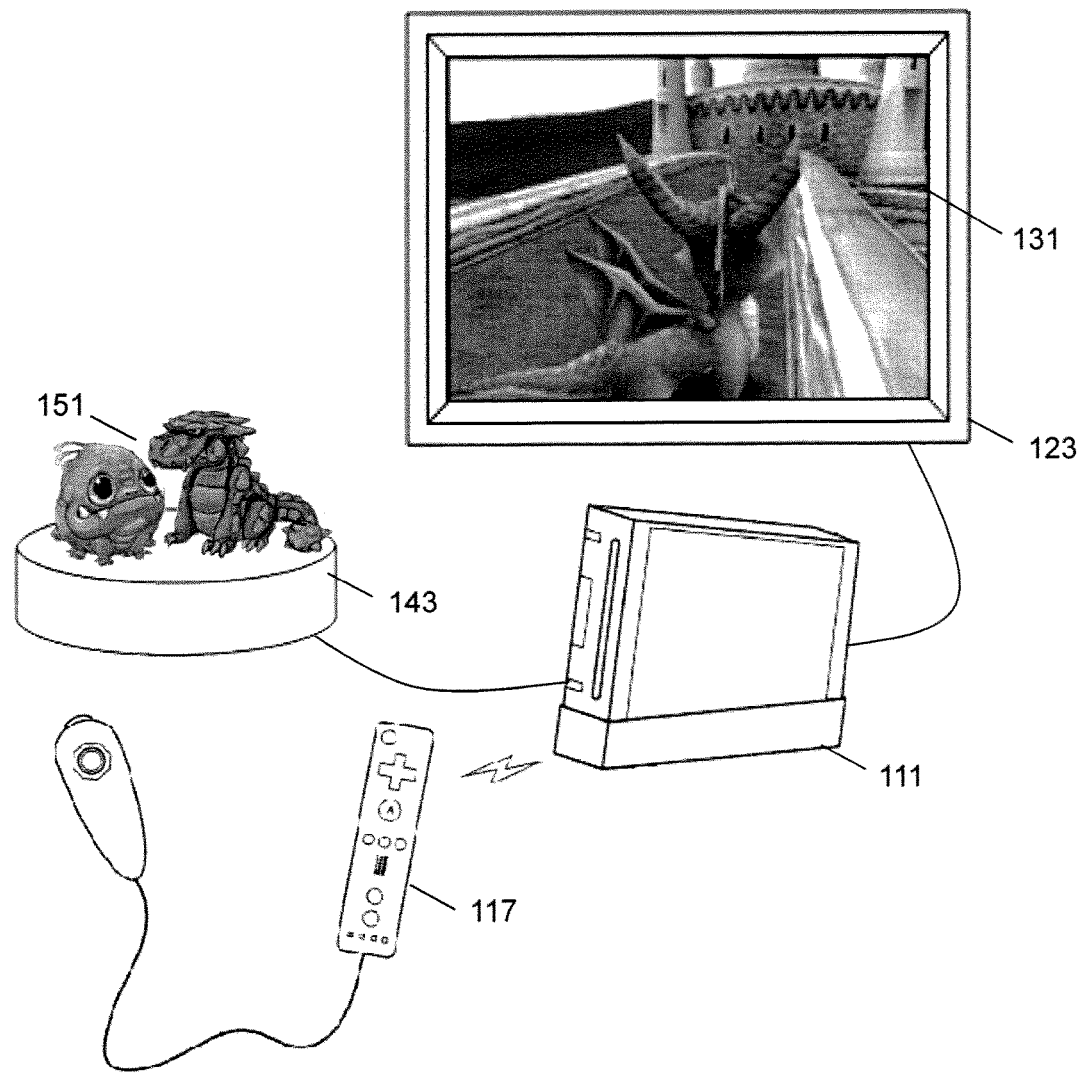
FIG. 1 illustrates an example of a video game system in accordance with aspects of the invention.

FIG. 1 illustrates an example of a video game system in accordance with aspects of the invention. The video game system includes a game console 111 with a processor for executing program instructions providing for game play and associated circuitry, user input devices such as a game controller 117, a display device 123, and a toy reader 143, which in various embodiments includes the capability to provide write information to a toy but for convenience will generally be termed a reader. The processor, responsive to inputs from the user input devices and the toy reader, generally commands display on the display device of game characters in and interacting with a virtual world of game play and possibly each other. In addition, the processor, responsive to inputs from the reader, may also add characters and objects to the virtual world, with the characters able to manipulate the added objects and move about the virtual world. For example, the processor may include characters in game play based on inputs from the reader, and the processor may control actions and activities of game characters based on inputs from the user input devices.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad.

The display device is generally coupled to the game console by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the game console. In the embodiment of FIG. 1, the display screen shows a screen shot of video game play. As illustrated, the screen shot shows a display of a character, generally controlled by and animated in accordance with user inputs, approaching an inanimate item in the form of what may be considered a castle.

The toy reader, in some embodiments and as shown in FIG. 1, has a substantially flat upper surface for placement of toys thereon. The game player generally places game toys, for example, objects 151 in the form and representative of a dragon and another fantasy figure as shown in FIG. 1, on the flat surface of the reader during game play. The toys are generally in the form of and representative of game items such as game characters or other game items. In most embodiments, the toys are associated with game characters during game play.

Each toy includes machine-readable information, for example, memory, a radio frequency identification (RFID) tag or a barcode. The machine-readable information may be sensed, read, and/or in some embodiments written, by the reader, in some embodiments indirectly by way of sending data and commands to the toy to write the data to memory of the toy. The machine-readable information may include a numeric identifier. The machine-readable information allows the reader, or the processor of the game console, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game.

When a toy is read by the reader, the reader provides the game console an indication of the identifier and status information of the toy, and generally the processor of the game console commands display of a corresponding game character or otherwise makes the corresponding game character available in game play. Likewise, when a toy in the form of an article such as a hat is placed on the reader, the processor may make a corresponding article appear in the game and the article may effect changes or the ability to make changes in the game. For example, when a hat toy and a character toy are concurrently on the reader, the corresponding character in the game may possess the corresponding hat. Thus, video game play may be affected by use of real world objects, objects which may also be utilized for play and/or observation separate from video game play.

Figure 2:
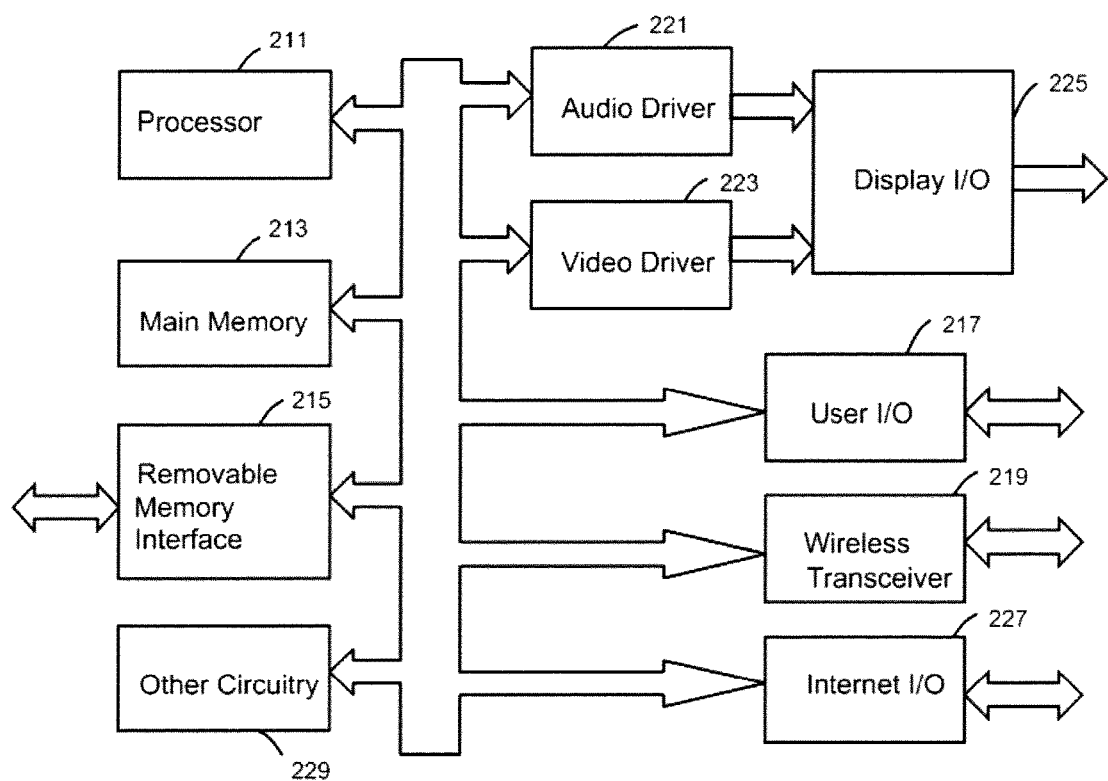
FIG. 2 is a block diagram of a video game console in accordance with aspects of the invention.

FIG. 2 is an example of a block diagram of a processor and associated circuitry, for example, for a game console, useful in accordance with aspects of the invention. As shown in FIG. 2 a processor 211 is connected to other components via a bus. The other components include a main memory 213 and a removable memory interface 215 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console. Sound signals may also be supplied to a peripheral device such as a toy reader.

The processor may also be coupled to a user I/O device 217, a wireless transceiver 219, an Internet I/O device 227, and other circuitry 229. The user I/O device may receive signals from a toy reader and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 3:
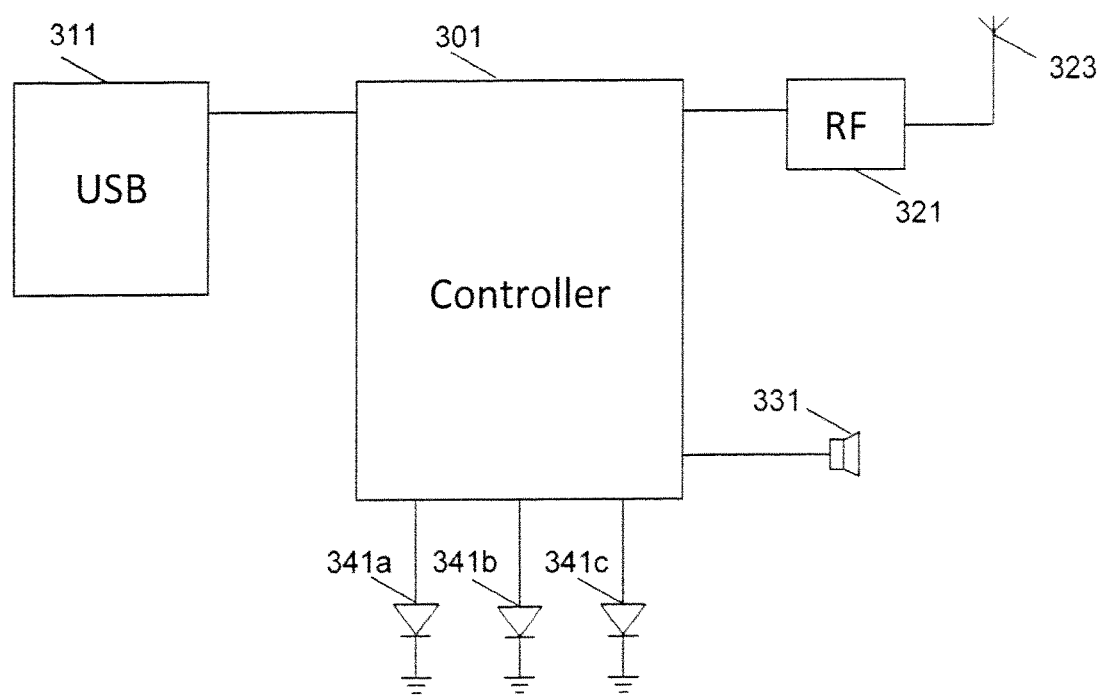
FIG. 3 is a block diagram of a video game peripheral in accordance with aspects of the invention.

FIG. 3 is a block diagram of a video game peripheral in accordance with aspects of the invention. The peripheral may be used in some embodiments as the toy reader of FIG. 1. The peripheral may be used to provide information from the toy to a game console and, in some embodiments, from the game console to the toy. Accordingly, the peripheral includes a universal serial bus (USB) interface 311 to communicate with the game console. In some embodiments, the peripheral may use a different interface, for example, a wireless interface for communication with the game console. The information communicated between the peripheral and the game console may be encrypted, and the information read from or written to the toy by the peripheral may also be encrypted.

The peripheral also includes a radio-frequency interface 321 to communicate with toys. In many embodiments, the radio-frequency interface is an RFID interface. In other embodiments, the peripheral may include a different interface for communicating with toys, such as an optical interface or a wired interface.

In one embodiment of an optical interface the toy includes a light source, for example an LED, to provide information of the machine readable information and a photodiode to receive information of commands, with circuitry operable within the toy to provide for associated operation of the LED and photodiode in performing communication functions. Power may be provided to the toy by way of a battery, by way of RFID operations, or by other sources. In such an embodiment the toy reader similarly includes a photodiode and LED for communication with the toy.

In another embodiment the toy reader includes an imaging device, for example a CCD and associated circuitry. In such embodiments the imaging device may generate an image, for analysis by the reader or in most embodiments by the game console, with the image providing information related to the toy. In some embodiments identity of the toy may be determined by shape or other features, such as color or reflectivity, of the toy or portions of the toy. Similarly, identity and other information of the toy may be provided by image information placed on the toy, including, for example, information of stickers placed on the bottom of the toy, placed either prior to receipt of the toy by a user or by the user, in which case the information may be changed by the user in accordance with game play results. The toy may instead or in addition may include bar code or bar code like information, with the reader including bar code scanning components.

Further in some embodiments the toy may include a wired connection to the reader, or in some embodiments, a wired connection to the game console, possibly dispensing with the reader. Similarly, in some embodiments the toy may include wireless communication capabilities of the type commonly used with computers, for example Bluetooth or Wi-Fi capabilities.

The peripheral includes a controller 301 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a game console over the USB interface. For example, the controller may, via the radio-frequency interface, regularly detect what toys are newly present on the peripheral and report the detected toys to the game console via the USB interface. The controller generally includes a programmable device such as a microprocessor performing program instructions. The program instructions may be stored in the peripheral as firmware or downloaded from the game console.

The peripheral also includes, in some embodiments, a loudspeaker 331. The loudspeaker provides audio signaling to game players and the signaling may relate to a particular toy present on the peripheral. In some embodiments, the peripheral includes visual indicators such as light-emitting diodes 341*a-c*. The diodes may, for example, be illuminated with intensities or colors that signal performance in the video game of characters associated with toys on the peripheral. Both the loudspeaker and visual indicators are coupled to the controller. The controller signals the loudspeaker and visual indicators to operate according to commands received via the USB interface.

Figure 4:
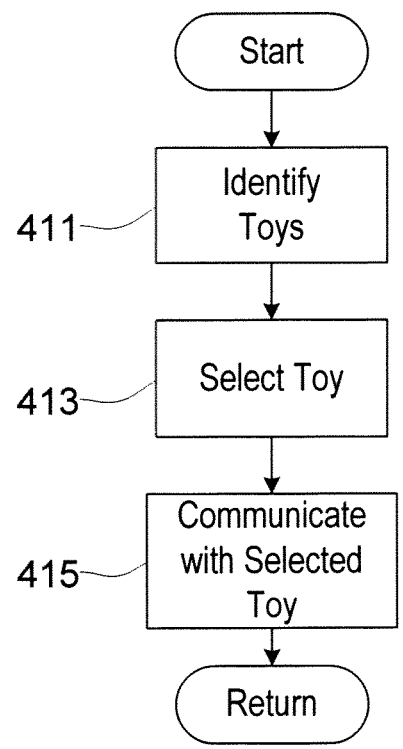
FIG. 4 is a flowchart of a process for communication with toys in accordance with aspects of the invention.

FIG. 4 is a flowchart of a process for communication with toys in accordance with aspects of the invention. The process may be implemented by a video game peripheral, a video game console, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 411, the process identifies toys in a defined region. For example, the process may determine what toys are on the surface of a video game peripheral as shown in FIG. 3. In various embodiments, the toys may be identified by RFID, barcodes, or optical recognition. In one embodiment, identification of toys includes a video game peripheral reading identifiers of the toys and supplying the identifiers to a video game console.

In block 413, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 415, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the video game associated with the process that the selected toy is not available. The process thereafter returns.

Figure 5:
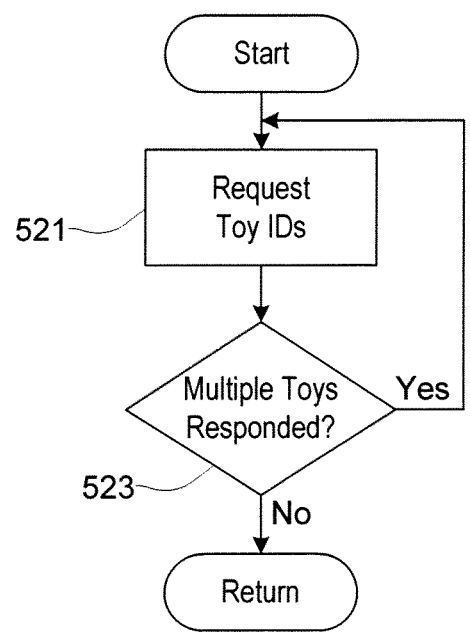
FIG. 5 is a flowchart of a process for identifying toys in accordance with aspects of the invention.

FIG. 5 is a flowchart of a process for identifying toys in accordance with aspects of the invention. The process may be performed as part of a process for communication with toys such as the process of FIG. 4. Accordingly, the process may be performed by a video game console, a video game peripheral, or a combination of devices, and the process may use a processor configured by program instructions.

In block 521, the process requests that toys send their identifiers. For example, in an embodiment of the process that uses the ISO/IEC 14443 protocol, the process may transmit a request command (REQA) or a wake-up command (WUP). The process listens for and receives any responses to the request that toys send their identifiers. Each identifier is generally unique to a particular toy.

In block 523, the process determines whether multiple toys responded to the request sent in block 521. For example, multiple toys may respond when there are multiple toys in a region that receives the request of block 521. The process may determine that multiple toys responded by detecting a collision between identifiers in the responses received in block 521. When the process determines that multiple toys responded, the process returns to block 521; otherwise, the process returns. The process may also determine that no toys responded. In various embodiments, the process may return when no toys responded or may return to block 521.

The process may, in block 521, include a range of identifiers in the request that toys send their identifiers. For example, the process may include a string of bits (for example, least-significant bits) in the request, with only toys having identifiers with starting bits having values that match the string being requested to send their identifiers. The process may iterate through block 521 and block 523 with an increasingly narrow range of identifiers in the request until an identifier is individually received from each toy. The string of bits included in the request that toys send their identifiers may include the bits that were received by the process in block 521 prior to the collision detected in block 523 followed by a zero bit, and in a subsequent iteration followed by a one bit. For example, after sending a request for all toys to send their identifiers, the process may receive a one bit and a zero bit followed by a collision of bit values. The process accordingly requests toys whose identifiers start with one, zero, and zero to send their identifiers, and depending on the response or responses received may add additional bits to the string of bits in the request for identification. The process later requests toys whose identifiers start with one, zero, and one to send their identifiers, and depending on the response or responses received may add additional bits to the string of bits in the request for identification. The process may iterate through block 521 and block 523 performing a binary tree search for identifiers.

Figure 6:
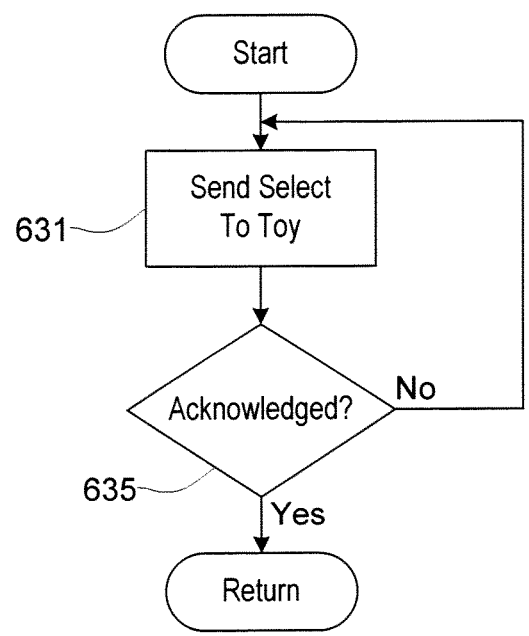
FIG. 6 is a flowchart of a process for selecting a toy in accordance with aspects of the invention.

FIG. 6 is a flowchart of a process for selecting a toy in accordance with aspects of the invention. The process may be part of a process for communication with toys such as the process of FIG. 4. Accordingly, the process may be performed by a video game console, a video game peripheral, or a combination of devices, and the process may use a processor configured by program instructions.

In block 631, the process selects a toy for further communication. The process may, for example, select the toy by sending a select command (SEL) that includes the identifier of the selected toy.

In block 635, the process determines whether it received an acknowledgment from the toy in response to the selection of block 631. The process may, for example, determine that it received an acknowledgment when it receives a selection acknowledge (SAK) message from the selected toy. When the process determines that it has received an acknowledgment, the process returns; otherwise, the process returns to block 631 to retry selecting the toy. In other embodiments, the process may return when an acknowledgment has not been received. When the process does not receive an acknowledgment, the process may additionally inform a video game associated with the process that the selected toy is not present.

Figure 7:
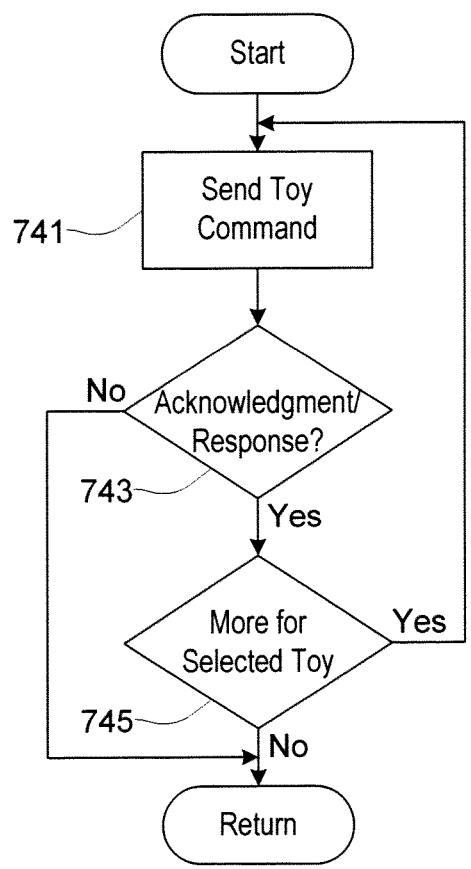
FIG. 7 is a flowchart of a process for communicating commands with a toy in accordance with aspects of the invention.

FIG. 7 is a flowchart of a process for communicating commands with a toy in accordance with aspects of the invention. The process may be as part of a process for communication with toys such as the process of FIG. 4. Accordingly, the process may be performed by a video game console, a video game peripheral, or a combination of devices, and the process may use a processor configured by program instructions.

In block 741, the process sends a command to the toy. For example, the process may send a read command to acquire data from the toy or a write command to supply data to the toy. Accordingly, the command may include an address value indicating a memory location in the toy to be accessed.

In block 743, the process determines whether it received an acknowledgment from the toy in response to the command sent in block 741. The process may, for example, determine that it received an acknowledgment when it receives a message containing a positive acknowledgment (ACK) from the toy. For a read command, the acknowledgment may include the data read. When the process determines that it has received an acknowledgment, the process continues to block 745; otherwise, the process returns. In other embodiments, the process may return to block 741 to retry sending the command when an acknowledgment has not been received. When the process does not receive an acknowledgment, the process may additionally inform a video game associated with the process that the toy being command to communicate is not present.

In block 745, the process determines whether it has any more commands to send to the toy. The process may determine that it has more commands for the toy, for example, by checking a list of actions in the video game associated with the process. When the process determines that there are more commands for the toy, the process returns to block 741; otherwise, the process returns.

Figure 8:
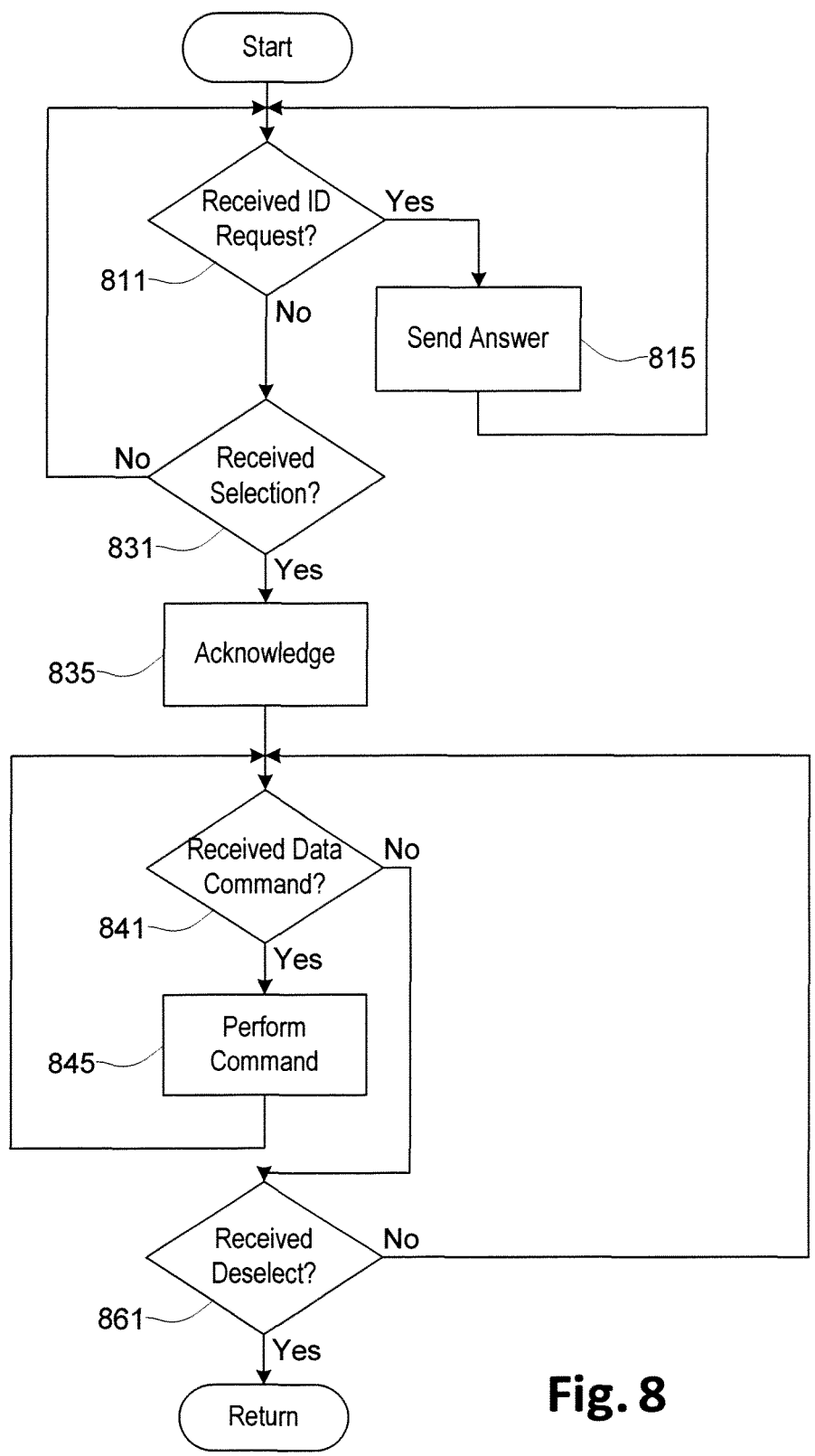
FIG. 8 is a flowchart of a process for communication with a video game peripheral in accordance with aspects of the invention.

FIG. 8 is a flowchart of a process for communication with a video game peripheral in accordance with aspects of the invention. The process may be implemented by a toy used in a video game, for example, one of the toys of FIG. 1. The process may be performed utilizing a standardized protocol, for example, the ISO/IEC 14443 standard for Identification Cards. Accordingly, the process may communicate with a video game peripheral via radio-frequency communication. Furthermore, the process may communicate with a video game peripheral that performs any of the process illustrated in FIGS. 4-7.

In block 811, the process determines whether it has received a request for an identifier associated with the toy. For example, in an embodiment of the process that uses the ISO/IEC 14443 protocol, the process may determine whether it has received a request command (REQA) or a wake-up command (WUP). A request for an identifier may include a range of identifiers that are requested to respond, and the process determines that it has received a request for its identifier when its identifier is within the requested range of identifiers. When the process determines that it has received a request for its identifier, the process continues to block 815; otherwise, the process continues to block 831.

In block 815, the process sends an answer to the request for its identifier. The answer generally includes the identifier or a portion of the identifier. For example, the request for the identifier may have included a portion of the identifier with the process including the remaining portion of the identifier in the answer. Thereafter, the process returns to block 811.

In block 831, the process determines whether it has been selected for further data communication. The process may, for example, determine that it has been selected when a select command (SEL) is received that includes the identifier of the toy. When the process determines that it has been selected, the process continues to block 835; otherwise, the process returns to block 811.

In block 835, the process acknowledges the selection determined in block 831. The process may, for example, transmit a selection acknowledge (SAK) message.

In block 841, the process determines whether it has received a data command. The process may, for example, determine that it has received a command instructing it to read data from or write data to a memory. When the process determines that it has received a data command, the process continues to block 845; otherwise, the process continues to block 861.

In block 845, the process performs the command of block 841. For example, the process may perform a read command by reading values from the memory and transmitting the values. In another example, the process may perform a write command by writing values supplied with command to the memory and transmitting an acknowledgment of the command. Thereafter, the process returns to block 841.

In block 861, the process determines whether it has been deselected from further data communication. The process may, for example, determine that it has been deselected when it receives a deselect command (DESEL) or a halt command (HLTA). When the process determines that it has been deselected, the process returns; otherwise, the process returns to block 841. In some embodiments, the process may wait in a halted state until it receives a wake-up command (WUP) before it returns. When the process is in the halted state, it does not respond to identification request commands, selection commands, or data commands.

Figure 9:
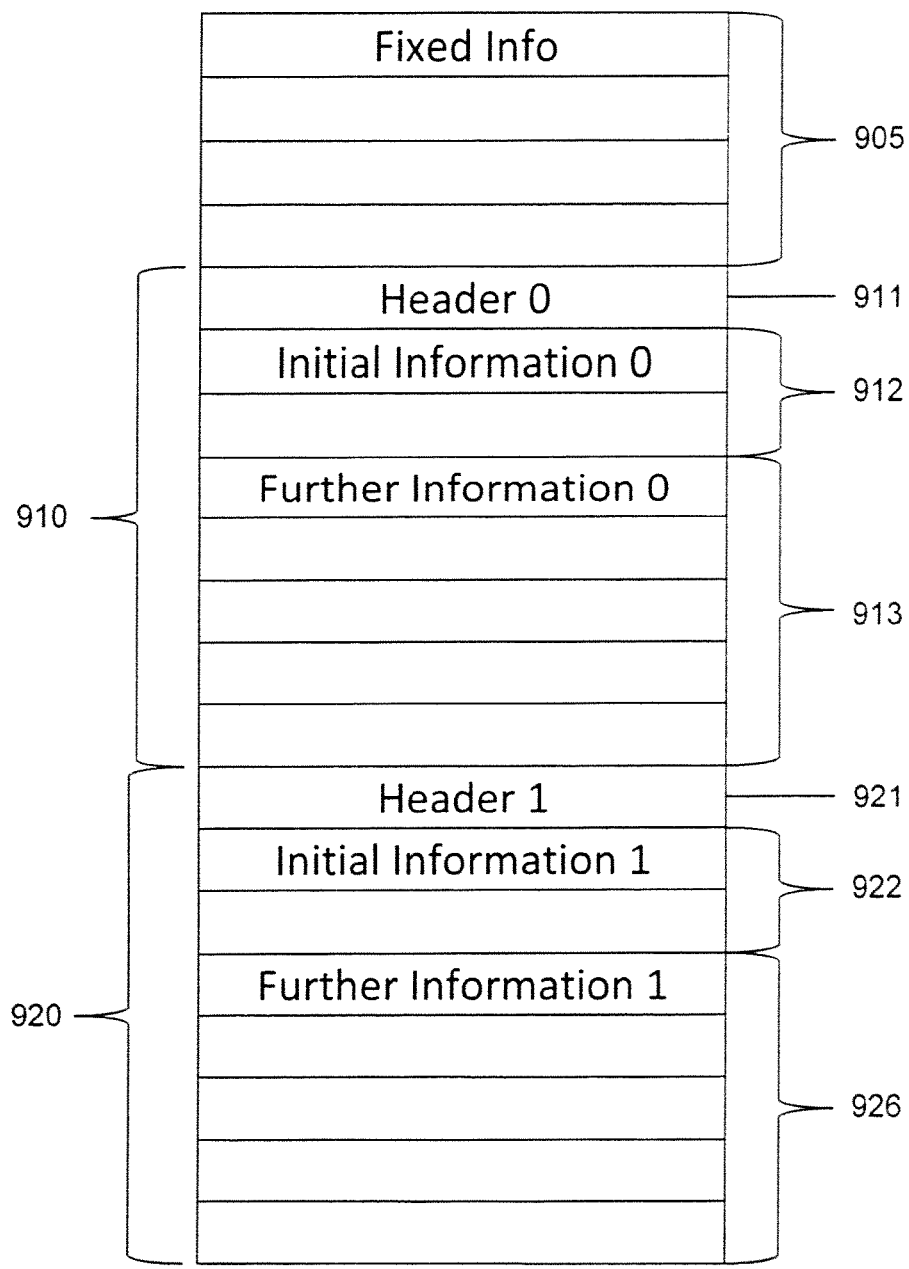
FIG. 9 is a diagram of data structure in accordance with aspects of the invention.

FIG. 9 is a diagram of data structure in accordance with aspects of the invention. The structure may be used to store data in a memory of a toy. Information about the toy, such as its characteristics and its status, are stored at various locations in the data structure. Although various fields of the data structure are shown in particular locations in FIG. 9, the data structure may use a different arrangement of the fields.

The data structure includes an area of fixed information 905. The fixed information includes information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or checksum. The fixed information is generally written when the toy is created and not thereafter changed.

The data structure also includes a first data area 910 and a second data area 920. Each of the data areas contains corresponding fields for certain values representing status information about a game play character associated with the toy. However, the first data area and the second data area contain values that reflect the toy's status at different times. For example, the first data area may contain current values and second data area may contain previous values. How which of the data areas is current may be determined and controlled is described further below.

The first data area 910 includes a first header 911. The first header includes information about the toy that may change frequently during game play, such as fields that store score values, experience levels, or money values. The first header may also include a field indicating how much cumulative time the toy has been used for game play. The first header also contains a sequence field that may be used to determine whether the first data area contains current data.

The first data area 910 includes a first initial information area 912. The first initial information area includes information about the toy for use in adding the character associated with the toy to game play. For example, the first initial information area may include a field that stores a name for the toy. The first initial information area may include additional fields that store information useful for displaying a representation of the character associated with the toy in the game. For example, there may be information indicating upgrades that have been acquired for the character associated with toy or objects the character may be wearing, such as hats. In some embodiments, however, the fixed information may contain sufficient information for adding the character associated with to the toy to game play, with the fixed information used instead of the initial information.

The first data area 910 includes a first further information area 913. The first further information area includes fields that indicate additional information about the character's status beyond the information contained in the first header and the first initial information area. The fields in the first further information area may include, for example, a value indicating when the character associated with the toy most recently joined the game, a value indicating when the toy was first used in the game, an indication of a player to which the toy belongs, and an indication of what challenges or skill tests the character associated with the toy has completed in the game.

The first data area generally includes one or more fields for data verification, for example, checksums. In one embodiment, the first header includes three checksums: a checksum for the entire first data area, a checksum for the initial information area, and a checksum for the header itself. The inclusion of three checksums may allow the corresponding areas to be verified or updated without reading or writing other areas.

The second data area 920 includes a second header 921, a second initial information area 922, and a second further information area 923. Each of the areas in the second data area corresponds to a like named area in the first data area. In some embodiments, the data structure includes additional data areas, for example, a third data area and a fourth data area.

Figure 10:
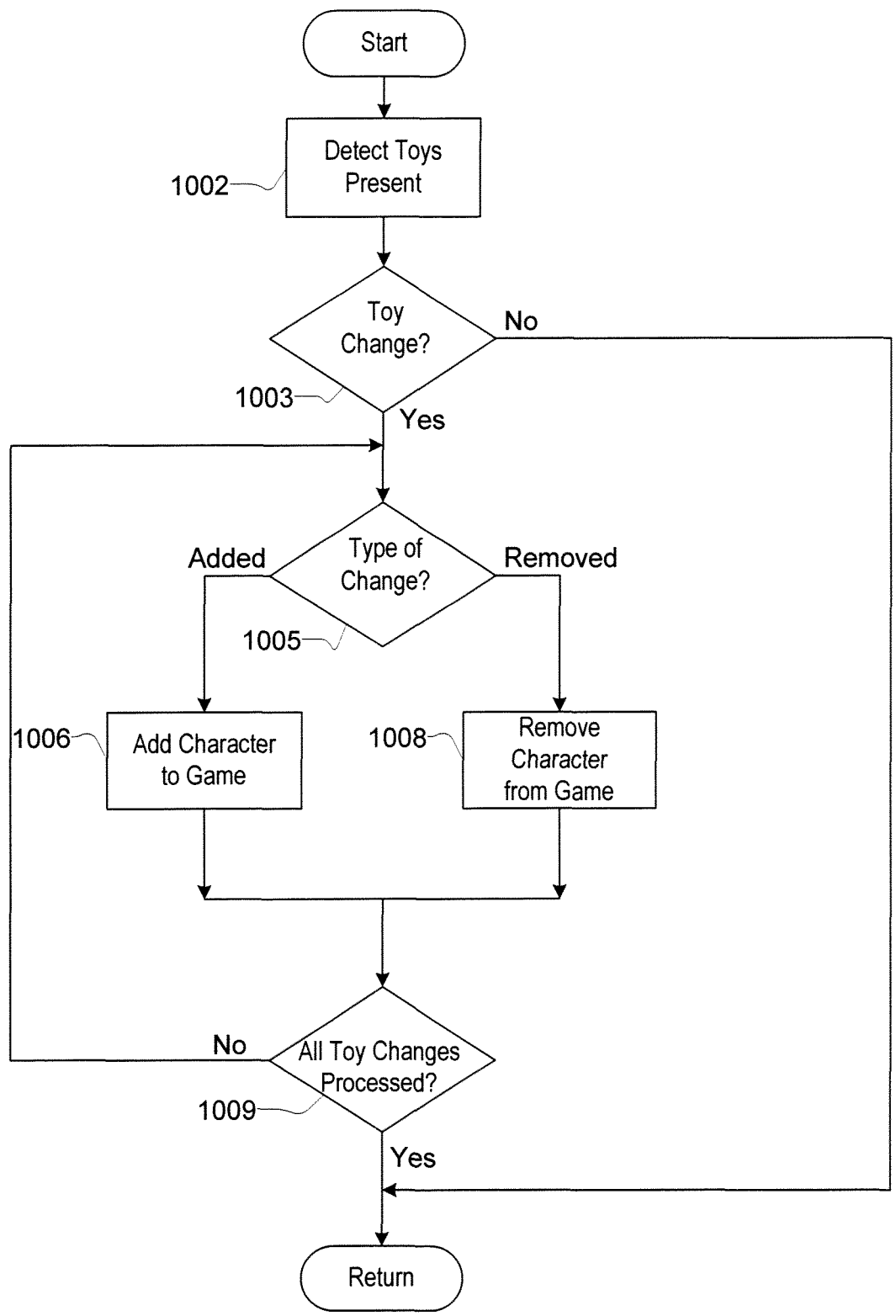
FIG. 10 is a flowchart of a process for changing characters present in a video game in accordance with aspects of the invention.

FIG. 10 is a flowchart of a process for changing characters present in a video game in accordance with aspects of the invention. The process may be performed by a video game console, a video game peripheral, or a combination of devices, and the process may use a processor configured by program instructions. Additionally, the process is generally performed repeatedly during play of the video game, for example, every second.

In block 1002, the process detects toys present on or near a toy reader. In some embodiments, the process detects toys using a video game peripheral as described with reference to FIG. 3, and the process may detect which toys are present using a process as described with reference to FIG. 5.

In block 1003, the process determines whether there has been a change in the toys present. For example, the process may compare identifiers of the toys detected in block 1002 to a list of toy identifiers currently considered present in the video game or detected on a prior execution of the process. In some embodiments, the process may use a count of the toys present to determine a change in the toys present. When the process determines that there has been a change in the toys present, the process continues to block 1005; otherwise, the process returns.

In block 1005, the process determines a type of change in the toys present. When the process determines that the type of change in the toys present includes an addition of a toy, the process continues to block 1006; when the process determines that the type of change in the toys present includes a removal of a toy, the process continues to block 1008. When the type of change includes both addition and removal, the process, in various embodiments, may determine the type of change based on a fixed priority, a dynamic priority, or randomly depending, for example, on characteristics of the video game. In other embodiments, the process may continue to block 1006 and block 1008 concurrently.

In block 1006, the process adds a character associated with an added toy to the video game. For example, the process may display a representation of the character in the game and include the character in game play. When multiple toys have been added the process may select one of the toys to be added first. For example, the process may select a toy based on a prioritization or randomly. In other embodiments, the process may add characters associated with multiple toys concurrently. Thereafter the process continues to block 1009.

In block 1008, the process removes the character associated with a removed toy from the video game. For example, the process may remove display of a representation of the character from the game and exclude the character from subsequent game play. When multiple toys have been removed the process may select one of the toys to be removed first. In other embodiments, the process may remove multiple toys concurrently. Thereafter the process continues to block 1009.

In block 1009, the process determines whether all of the changes in toys present have been processed. The process may, for example, form a list of changes in block 1003 and remove toys from the list when the toys are added to the game in block 1006 or removed from the game in block 1008. When the process determines all of the changes have been processed, the process returns; otherwise, the process returns to block 1005.

Figure 11:
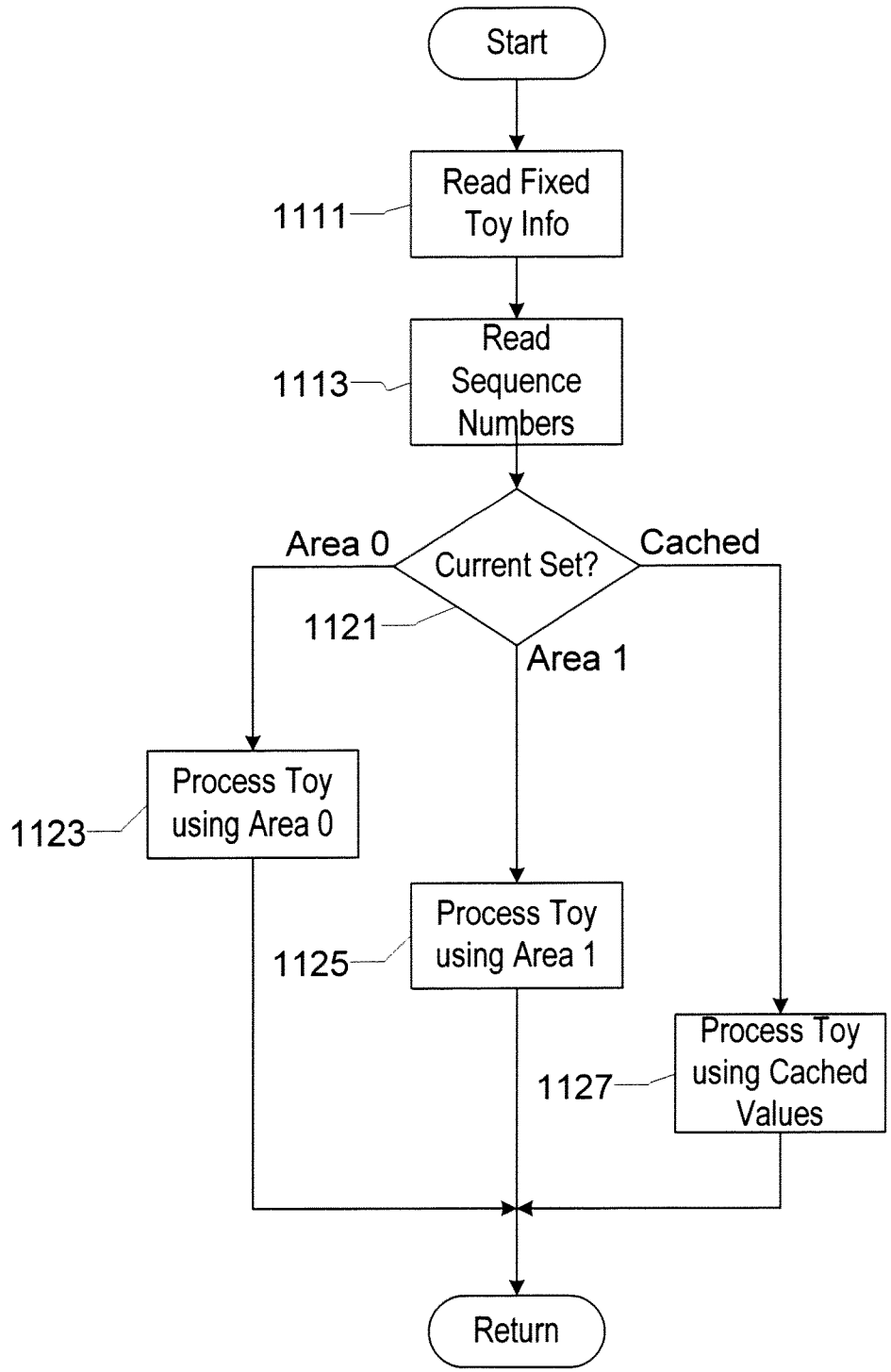
FIG. 11 is a flowchart of a process for adding characters in a video game in accordance with aspects of the invention.

FIG. 11 is a flowchart of a process for adding characters in a video game in accordance with aspects of the invention. The process may be performed by a video game console, a video game peripheral, or a combination of devices, and the process may use a processor configured by program instructions. The process of FIG. 11 may be performed in association with the process for changing characters present in a video game of FIG. 10. Additionally, the process may be used with toys that store information in a data structure as illustrated by FIG. 9. Multiple instances of the process may be concurrently, for example, an instance of the process for each of multiple toys.

In block 1111, the process reads fixed information from a toy. The information may be read using a process as shown in FIG. 4. The fixed information includes values that uniquely identify the toy and type of toy.

In block 1113, the process reads sequence values for each of multiple data areas of toy information. The flowchart of FIG. 11 illustrates a process for toys with two data areas, data area 0 and data area 1, but other numbers of data areas may be used. The sequence numbers may be stored in headers of the data areas. Each sequence value indicates when, in comparison to other headers, the header was written. For example, the sequence value may be incremented modulo a maximum value each time a header is written. The process may, in some embodiments, also determine a sequence number for cached data values associated with the toy. The video game may save data values for the toy in a cache from when the toy was previously played in the game. The cached data values may, for example, be useful when they contain updated values that had not been written to the toy before the toy was previously removed from the video game.

In block 1121, the process determines which sequence value is most recent. The process may order the sequence values according to the order in which they would be generated and select the last in sequence as the most recent. When the process determines that the sequence value from data area 0 is most recent, the process continues to block 1123; when the process determines that the sequence value from data area 1 is most recent, the process continues to block 1125; when the process determines that the cached sequence value is most recent, the process continues to block 1127.

In block 1123, the toy is processed using data area 0. For example, the process may read toy information from data area 0 and use the information to add a character associated with the toy to the video game. Thereafter the process returns.

In block 1125, the toy is processed using data area 1. Processing the toy is generally as for block 1123 except information from data area 1 is used. Thereafter the process returns.

In block 1127, the toy is processed using cached values. Processing the toy is generally as for block 1123 except cached information about the toy is used. Thereafter the process returns.

The process of FIG. 11 may include error checking of information read from the toy. When the process determines that data read from the toy contains an error or is unreliable, it may alter the processing. For example, if one of the sequence numbers read in block 1113 is unreliable, the associated data area may be excluded from further processing.

Figure 12:
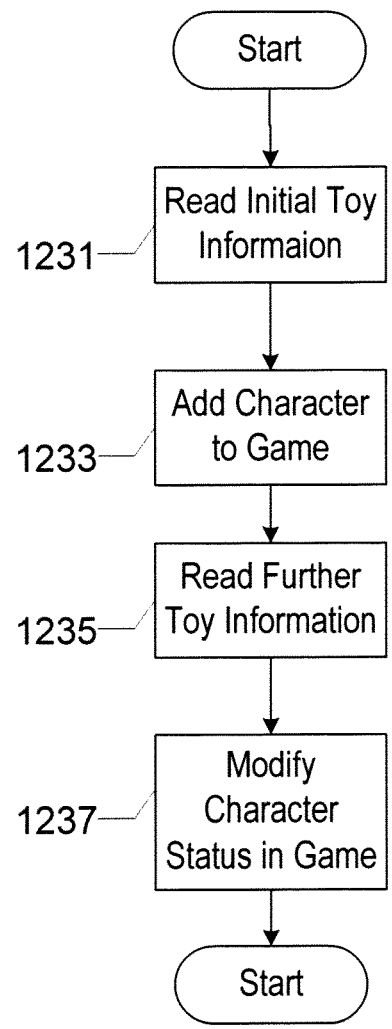
FIG. 12 is a flowchart of a further process for adding characters in a video game in accordance with aspects of the invention.

FIG. 12 is a flowchart of a further process for adding characters in a video game in accordance with aspects of the invention. The process may be performed by a video game console, a video game peripheral, or a combination of devices, and the process may use a processor configured by program instructions. The process of FIG. 12 may be performed as part of block 1006 of the process of FIG. 10 and also in association with the process of FIG. 11. The process may be used with toys that store information in a data structure as illustrated by FIG. 9.

In block 1231, the process reads initial information from the toy. The initial information includes information about the toy that is used to add the toy to game play. In some embodiments, the initial information is read using a process illustrated by FIG. 4. In some embodiments, the initial information includes a name of the toy and objects the toy is wearing. In one embodiment, the process commands a video game peripheral to read the initial information from the toy. In another embodiment, the process may receive initial information that had previously been read by a video game peripheral.

In block 1233, the process adds the toy to the video game. For example, the process may display a representation of a character associated with the toy or an animated sequence for the character on the display screen of the video game system illustrated by FIG. 1. Displaying the character utilizes the initial information read in block 1231. The process also makes the character available for subsequent game play.

In block 1235, the process reads further information from the toy. The further information is generally read in the same manner the initial information was read in block 1231. The further information may include, for example, a value indicating when the toy most recently joined the game, a value indicating when the toy was first used in the game, an indication of which player the toy belongs to, and an indication of what challenges or skill tests the character associated with the toy has completed in the game, and various information related to the status, for example the capabilities, of the character associated with the toy, for example as may have been modified or changed as a result of prior game play. The further information combined with the fixed and/or initial information generally includes complete information available from the toy.

In block 1237, the process modifies status of the character associated with the toy in the video game. For example, the process may add details read in block 1235 to the character representing the toy and to the status of the character in the video game. Thereafter the process returns.

Figure 13:
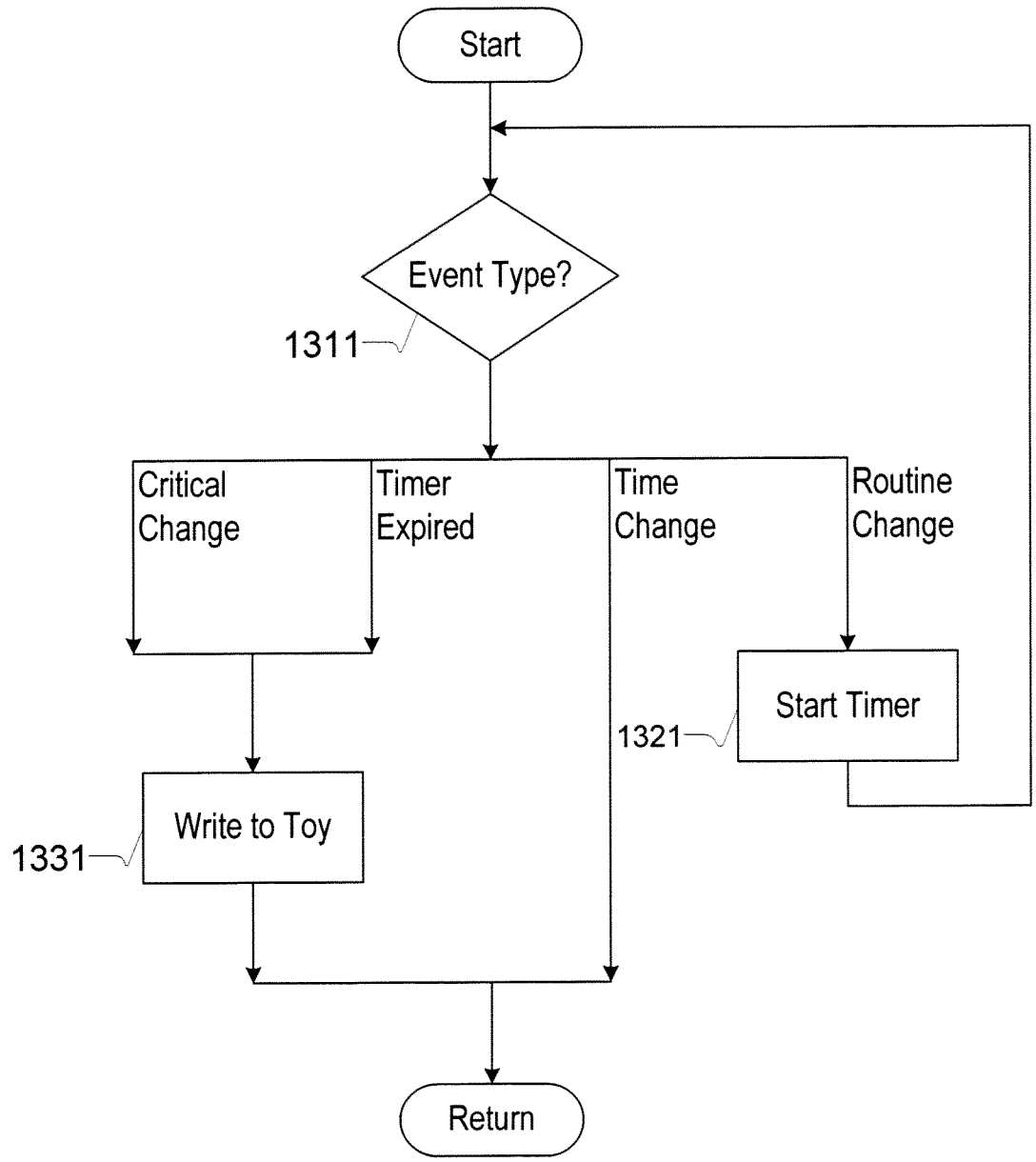
FIG. 13 is a flowchart of a process for events that update toy information in accordance with aspects of the invention.

FIG. 13 is a flowchart of a process for processing events that update toy information in accordance with aspects of the invention. The process is performed in association with a video game and may be performed by, for example, the video game console of FIG. 1 or the processor of FIG. 2, as configured by program instructions, in conjunction with associated circuitry. The process may be used with toys that store information in a data structure as illustrated by FIG. 9. Additionally, multiple instances of the process may be performed concurrently, for example, performing an instance of the process for each of multiple toys.

In block 1311, the process determines a type of event that may result in updating information in the toy. The process may determine the event type based at least in part on game play events.

In block 1311, if the process determines that the event type is a time change, the process returns. That is, a time-change event does not result in the process currently writing information to the toy. In some embodiments, the process writes time-based information, for example, a cumulative play time value or a last time played, to the toy when another event causes the process to write other information to the toy.

In block 1311, if the process determines that the event type is a critical type, the process continues to block 1331. A critical-type event is an event for which it is desirable to quickly update information in the toy. Critical-type events may include, for example, changes to the toy's name, changes to performance levels of the toy, or acquisition of upgrades for the toy.

In block 1311, if the process determines that the event type is a routine type, the process continues to block 1321. A routine-type event is an event for which writing information to the toy may be deferred. Routine-type events may include, for example, changes to the toy's score or changes to the experience level of the toy. Routine-type events may occur frequently during game play and thus it may be desirable to otherwise use the time that would be used to write to the toy, for example, to process information for another toy.

In block 1321, the process starts a timer. For example, the process may start a timer that expires in three seconds. When the timer is already running, the process may, in various embodiments, restart the timer or let it continue running from its current state. The process thereafter returns to block 1311.

Referring again to block 1311, when the timer expires, the process continues to block 1331.

In block 1331, the process writes information to the toy. The process may write information to the toy by commanding a video game peripheral, such as the video game peripheral of FIG. 2, to perform the write. The written information generally corresponds to the event analyzed in block 1311. For example, when the event is an event to change the toy's name, a new name is written to the toy. Additional information may also be written to the toy. For example, time-based information or information based on a routine-type event may be written to the toy concurrently with writing information based on a critical-type event. The timer started in block 1321 is stopped when the process writes information to the toy related to the routine-type event that resulted in starting the timer. Although the timer started in block 1321 is not used for critical-type events, the process may incur incidental delays before writing information to the toy in block 1331. Thereafter the process returns.

Figure 14:
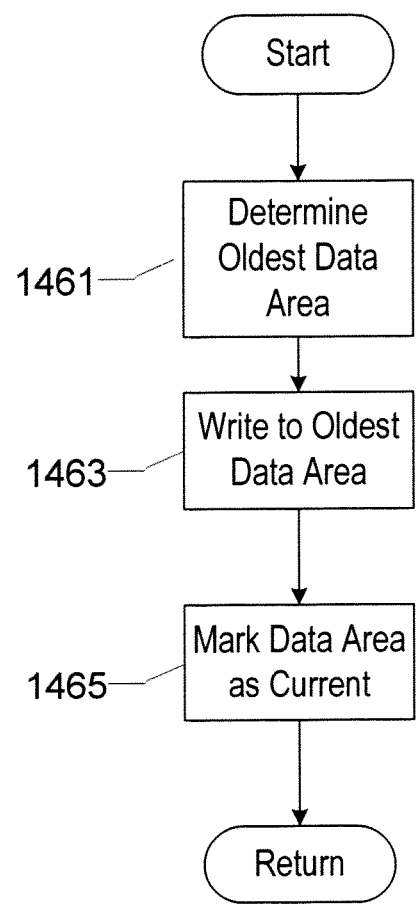
FIG. 14 is a flowchart of a process for writing information to a toy in accordance with aspects of the invention.

FIG. 14 is a flowchart of a process for writing information to a toy in accordance with aspects of the invention. The process is performed in association with or as part of a video game. The process may be performed by a video game console, a video game peripheral, or a combination of devices, and the process may use a processor configured by program instructions. The process of FIG. 14 may be performed in association with the process for updating toy information of FIG. 13 and may be used with toys that store information in a data structure as illustrated by FIG. 9. Additionally, multiple instances of the process may be performed concurrently, for example, an instance of the process for each of multiple toys.

In block 1461, the process determines the oldest of multiple data areas in the toy. The process may determine the oldest data area using sequence values in a manner analogous to that used to determine the current data area in the process of FIG. 11. In a particular embodiment in which there are two data areas in the toy, the oldest data area is the data area that is not the current data area.

In block 1463, the process writes to the data area determined to the oldest in block 1461. Writes may be performed using a process as shown in FIG. 4. In some embodiments, the process compares the data to be written to the toy with data previously read from the toy and omits writes would not change values in the toy.

In block 1465, the process marks the data area written to in block 1463 as the current data area. For data areas with sequence values, the process writes the next value in the sequence to the toy. For example, the sequence value from the previously current data area may be incremented, modulo a maximum value, and written to the toy.

The process, in many embodiments, verifies that the information writes to the toy were successful. For example, the process may read the values back from the toy and compare the results to the expected values. In the event of an error, the process may retry writing the information to the toy. Additionally, the process may write to the toy in blocks of data and in a particular order, for example, a checksum for the data may be written last.

Although the invention has been discussed with respect to various embodiments, it should be recognized that the invention comprises the novel and non-obvious claims supported by this disclosure.

What is claimed is:

1. A computer implemented method for use in providing a video game, comprising:
   determining that a change in toys present on or near a reader indicates that a toy has been added, such that information may be received from the toy;
   in response to determining that the change in toys present on or near the reader indicates that the toy has been added, adding a game character associated with the toy to the video game by:
      as part of adding the game character associated with the toy to the video game, receiving initial information from a memory of the toy, the memory of the toy including at least initial information stored in an initial information area of the memory of the toy and further information stored in a further information area of the toy, the initial information and the further information including information about the game character associated with the toy, the further information including information about the game character associated with the toy additional to information of the initial information,
      as part of adding the game character associated with the toy to the video game, displaying a representation of the game character associated with the toy utilizing the initial information, without regard as to whether the further information from the memory of the toy has been received, and making the game character associated with the toy available for game play in the video game,
      as part of adding the game character associated with the toy to the video game, receiving the further information from the memory of the toy, and
      as part of adding the game character associated with the toy to the video game, after displaying the representation of the game character associated with the toy and making the game character associated with the toy available for game play in the video game, modifying status of the game character associated with the toy by adding details of the further information received from the memory of the toy to the status of the game character associated with the toy.

2. The method of claim 1, wherein the initial information comprises a name of the game character associated with the toy.

3. The method of claim 1, wherein the initial information includes an identification of an object worn by the game character associated with the toy.

4. The method of claim 1, wherein the memory of the toy includes at least two sets of data areas including further information and further comprising:
   receiving sequence values from each of a plurality of data areas of the memory of the toy, each of the sequence values indicative of when the corresponding data area was written; and
   determining, utilizing the sequence values, a current one of the data areas to read at least the further information.

5. The method of claim 1, further comprising:
   detecting toys present such that information may be received from the toys present;
   determining, based on changes in the toys detected relative to a previous detection of toys present, whether the toy has been removed; and
   for each toy determined to have been removed, removing the game character associated with the removed toy from the video game.

6. The method of claim 1, further comprising:
   determining a type of event affecting the game character associated with one of the toys;
   when the determined type of event is a first type, writing, after a time period, information based on the event to the one of the toys; and
   when the determined type of event is a second type, writing, without substantial delay, information based on the event to the one of the toys.

7. The method of claim 6, wherein writing information based on the event to the one of the toys comprises:
   determining which of a plurality of data areas in a memory of the one of the toys is an oldest of the data areas; and
   writing the information based on the event to the oldest of the data areas.

8. The method of claim 1, wherein detecting toys present utilizes radio frequency identification.

9. The method of claim 1, wherein detecting toys present utilizes optical recognition.

10. A video game system, comprising:
    a peripheral configured to sense identifiers of a plurality of toys proximate the peripheral and read information from and write information to memories of the toys; and
    a processor configured by program instructions, the processor data coupled to the peripheral, the program instructions comprising instructions to:
       receive the identifiers of toys proximate the peripheral;
       determine changes in the toys detected relative to a previous sensing of toys proximate the peripheral; and
       for each toy determined to have been added, add a game character associated with the added toy to the video game,
       the instructions to add the game character associated with the added toy to the video game comprising instructions to:
          as part of adding the game character associated with the added toy to the video game, command the peripheral to read initial information about the game character associated with the added toy from a memory of the added toy,
          as part of adding the game character associated with the added toy to the video game, command display of a representation of the game character associated with the added toy utilizing the initial information and make the game character associated with the added toy available for game play in the video game,
          as part of adding the game character associated with the added toy to the video game, command the peripheral to read further information about the game character associated with the added toy from the memory of the added toy, the further information including additional information about the game character beyond that of the initial information, and
          as part of adding the game character associated with the added toy to the video game, after making the game character associated with the added toy available for game play, modify status of the game character associated with the added toy utilizing the further information read from the memory of the added toy.

11. The video game system of claim 10, wherein the program instructions further comprise instructions to: for each toy determined to have been removed, removing the game character associated with the removed toy from the video game.

12. The video game system of claim 10, wherein the peripheral is configured to sense the identifiers of multiple ones of the toys concurrently.

13. The video game system of claim 10, wherein the peripheral is configured to sense the identifiers of the toys using radio frequency identification.

14. The video game system of claim 10, wherein the instructions to command the peripheral to read initial information from the memory of the added toy comprise instructions to:
command the peripheral to read sequence values from each of a plurality of data areas of the memory of the added toy, each of the sequence values indicative of when the corresponding data area was written;
determine, utilizing the sequence values, the current one of the data areas; and
command the peripheral to read the initial information from the current one of the data areas.

15. The video game system of claim 10, wherein the program instructions further comprise instructions to: command the peripheral to write information to one of the toys indicative of a status of the game character associated with the one of the toys.

16. A non-transitory machine-readable medium for a video game, the machine-readable medium comprising program instructions for:
commanding a peripheral device to detect toys present in a region;
determining changes in the toys detected relative to a previous detection of toys present; and
for each toy determined to have been added, adding a game character associated with the added toy to the video game,
the program instructions for adding the game character associated with the added toy to the video game comprising program instructions for:
as part of adding the game character associated with the added toy to the video game, commanding the peripheral device to read initial information about the game character associated with the added toy from a memory of the added toy, as part of adding the game character associated with the added toy to the video game, commanding display of a representation of the game character associated with the added toy utilizing the initial information,
as part of adding the game character associated with the added toy to the video game, after commanding display of the representation of the game character associated with the added toy, commanding the peripheral device to read further information about the game character associated with the added toy from the memory of the added toy, the further information including additional information about the game character beyond that of the initial information, and
as part of adding the game character associated with the added toy to the video game, modify status of the game character associated with the added toy utilizing the further information read from the memory of the added toy.

17. The medium of claim 16, wherein the initial information comprises a name of the game character associated with the added toy.

18. The medium of claim 16, wherein the initial information comprises an identification of an object worn by the game character associated with the added toy.

19. The medium of claim 16, wherein the program instructions for commanding the peripheral to read initial information from the memory of the added toy comprise program instructions for:
commanding the peripheral to read sequence values from each of a plurality of data areas of the memory of the added toy, each of the sequence values indicative of when the corresponding data area was written;
determining, utilizing the sequence values, the current one of the data areas; and
commanding the peripheral to read the initial information from the current one of the data areas.

20. The medium of claim 16, further comprising program instructions for:
for each toy determined to have been removed, removing the game character associated with the removed toy from the video game.

21. The medium of claim 16, further comprising program instructions for:
determining a type of event affecting the game character associated with one of the toys;
when the determined type of event is a first type, commanding, after a time period, the peripheral device to write information based on the event to the one of the toys; and
when the determined type of event is a second type, commanding, without substantial delay, the peripheral device to write information based on the event to the one of the toys.

22. The medium of claim 21, wherein the program instructions for commanding the peripheral device to write information based on the event to the one of the toys comprise program instructions for:
determining which of a plurality of data areas in a memory of the one of the toys is an oldest of the data areas; and
commanding the peripheral device to write the information based on the event to the oldest of the data areas.

* * * * *